United States Patent
Liang et al.

(10) Patent No.: US 9,446,757 B2
(45) Date of Patent: Sep. 20, 2016

(54) ACTIVE MOTOR DAMPING CONTROL OF A HYBRID ELECTRIC VEHICLE POWERTRAIN

(71) Applicant: FORD GLOBAL TECHNOLOGIES, LLC, Dearborn, MI (US)

(72) Inventors: Wei Liang, Farmington Hills, MI (US); Mark Steven Yamazaki, Canton, MI (US); Rajit Johri, Ann Arbor, MI (US); Xiaoyong Wang, Novi, MI (US); Ryan Abraham McGee, Shanghai (CN); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 14/197,653

(22) Filed: Mar. 5, 2014

(65) Prior Publication Data
US 2015/0251649 A1   Sep. 10, 2015

(51) Int. Cl.
| | |
|---|---|
| *B60W 10/00* | (2006.01) |
| *B60K 6/48* | (2007.10) |
| *B60W 20/00* | (2016.01) |
| *B60L 15/20* | (2006.01) |
| *B60W 10/02* | (2006.01) |
| *B60W 10/08* | (2006.01) |
| *B60W 30/20* | (2006.01) |
| *B60W 50/00* | (2006.01) |

(52) U.S. Cl.
CPC .............. *B60W 20/108* (2013.01); *B60K 6/48* (2013.01); *B60L 15/20* (2013.01); *B60W 10/02* (2013.01); *B60W 10/026* (2013.01); *B60W 10/08* (2013.01); *B60W 20/15* (2016.01); *B60W 30/20* (2013.01); *B60K 2006/4825* (2013.01); *B60W 2050/0008* (2013.01); *B60W 2710/081* (2013.01); *Y02T 10/6221* (2013.01); *Y02T 10/6252* (2013.01); *Y02T 10/7258* (2013.01); *Y10S 903/903* (2013.01)

(58) Field of Classification Search
CPC .. B60W 20/108; B60W 20/15; B60W 10/02; B60W 10/026; B60W 10/08; B60W 30/20; B60K 6/48; B60L 15/20
USPC ......................................................... 701/22
See application file for complete search history.

(56) References Cited

U.S. PATENT DOCUMENTS

| | | | |
|---|---|---|---|
| 6,196,345 B1 | 3/2001 | Lyons | |
| 7,024,290 B2 | 4/2006 | Zhao | |
| 7,292,917 B2 | 11/2007 | Kuang | |
| 8,538,643 B1 * | 9/2013 | Wang .................... | B60W 10/08 340/453 |
| 2011/0053733 A1 * | 3/2011 | Swales .................. | B60W 10/08 477/3 |
| 2012/0262102 A1 | 10/2012 | Gee | |
| 2014/0257617 A1 * | 9/2014 | Klymenko ............ | B60W 30/20 701/22 |

* cited by examiner

*Primary Examiner* — Mussa A Shaawat
*Assistant Examiner* — Abdhesh Jha
(74) *Attorney, Agent, or Firm* — David Kelley; Brooks Kushman P.C.

(57) ABSTRACT

A hybrid electric vehicle includes an engine and an electric motor both configured to generate a vehicle powertrain torque and a controller programmed to control the powertrain torque for a limited duration in anticipation of a powertrain torque variation scenario using a damping function, wherein the damping function adjusts the vehicle powertrain torque based on a difference between a measured motor speed and a desired motor speed using the electric motor to counteract a powertrain speed oscillation.

20 Claims, 3 Drawing Sheets

ACTIVE MOTOR DAMPING CONTROL OF A HYBRID ELECTRIC VEHICLE POWERTRAIN

TECHNICAL FIELD

The present disclosure relates to active motor damping in hybrid electric vehicles.

BACKGROUND

Hybrid electric vehicles (HEVs) utilize both an engine and an electric motor, which may operate in unison or alone, to provide torque to the vehicle powertrain. All vehicles, hybrid and non-hybrid alike, experience vehicle powertrain speed oscillations that disrupt the smooth vehicle operation and vehicle drivability. Powertrain resonance is one of the major reasons that a driver feels unsmooth behavior. Typically, the unsmooth behavior is triggered by the powertrain resonance that occurs during transient events in the powertrain torque. Therefore, it is essential to damp the powertrain speed oscillation during transient events around the powertrain resonant frequency, which is a typical task in most automotive powertrain controls.

In a HEV application the electric motor can be used to damp powertrain speed oscillations. This is sometimes referred to as active motor damping (AMD). It is known, that some transient events contribute more to the powertrain resonance causing unsmooth behavior than other transient events. For example, a vehicle that uses a launch clutch to engage the power source (engine or electric motor) to the transmission gearbox may experience a larger speed disruption due to the powertrain speed oscillation while engaging the launch clutch, than a vehicle that uses a hydraulic torque converter to couple the power source to the transmission gearbox. This is because automatic transmissions with hydraulic torque converters have a large natural viscous damping effect. At higher vehicle speed and moderate torque variation conditions, the torque converter will typically be locked by a lock-up clutch or similar device that provides a mechanical coupling to minimize energy losses.

In order to minimize the potential impact to other vehicle or subsystem control actions, it would be desirable to provide a control system in a HEV that uses an electric motor to damp powertrain speed oscillations, where the control system is triggered only during specific transient events that could excite the powertrain resonance frequency and cause unsmooth behavior, while at the same time not being triggered during transient events that do not contribute considerably to the powertrain resonance frequency, where the unsmooth behavior is negligible.

SUMMARY

In one aspect of the disclosure, a hybrid electric vehicle is provided. The hybrid electric vehicle has both an engine and an electric motor that are configured to generate a vehicle powertrain torque. A controller is provided that activates, for a limited duration, a damping function in response to a powertrain torque variation scenario. Representative powertrain torque variation scenarios may include a transient event such as: an engine start, a partially or a completely closing of a launch clutch, a gear shift, a tip-in, a tip-out, a large torque command, a partially or a completely closing converter bypass clutch, etc., which may contribute to the powertrain resonance causing unsmooth behavior. The damping function adjusts the powertrain torque based on a difference between a measured motor speed and a desired motor speed, using the electric motor to counteract a powertrain speed oscillation.

A filter in a forward loop of the damping function may also be used to limit the damping function to within a predefined frequency range of the powertrain speed oscillation.

A feedback loop in the damping function may be used to generate a motor torque adjustment, which is subtracted from a desired motor torque resulting in an actual or commanded motor torque. The motor torque adjustment may be based on the difference between a measured motor speed and a desired motor speed. In one embodiment, the function in the feedback loop that generates the motor torque adjustment includes a derivative term which is proportional to a derivative of the difference between a measured motor speed and a desired motor speed, and a proportional term which is proportional to the difference between a measured motor speed and a desired motor speed (the function in the feedback loop may be referred to as a proportional derivative or PD controller).

The controller may be set to disable the damping function based upon a predetermined elapsed time or when a speed error reduces below a predetermined threshold, the speed error being the difference between a measured motor speed and a desired motor speed.

In another aspect of the disclosure, a method for controlling a hybrid electric vehicle is provided. The method includes: generating a vehicle powertrain torque with an engine and/or an electric motor; activating, for a limited duration, a damping function in response to a powertrain torque variation scenario such as: an engine start, a partially or a completely closing of a launch clutch, a gear shift, a tip-in, a tip-out, a large torque command, a partially or a completely closing of a torque converter bypass clutch, etc., which may contribute to the powertrain resonance causing unsmooth behavior); and adjusting the powertrain torque with the damping function based on a difference between a measured motor speed and a desired motor speed, using the electric motor to counteract a powertrain speed oscillation.

A filter in a forward loop of the damping function may also be used to limit the damping function to within a predefined frequency range of the powertrain speed oscillation.

A feedback loop in the damping function may be used to generate a motor torque adjustment, which is subtracted from a desired motor torque resulting in an actual or commanded motor torque. The motor torque adjustment may be a function of the difference between a measured motor speed and a desired motor speed. In one embodiment, the function in the feedback loop that generates the motor torque adjustment includes a derivative term which is proportional to a derivative of the difference between a measured motor speed and a desired motor speed, and a proportional term which is proportional to the difference between a measured motor speed and a desired motor speed.

The damping function of the method may be disabled based upon a predetermined elapsed time or when a speed error reduces below a predetermined threshold, the speed error being the difference between a measured motor speed and a desired motor speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
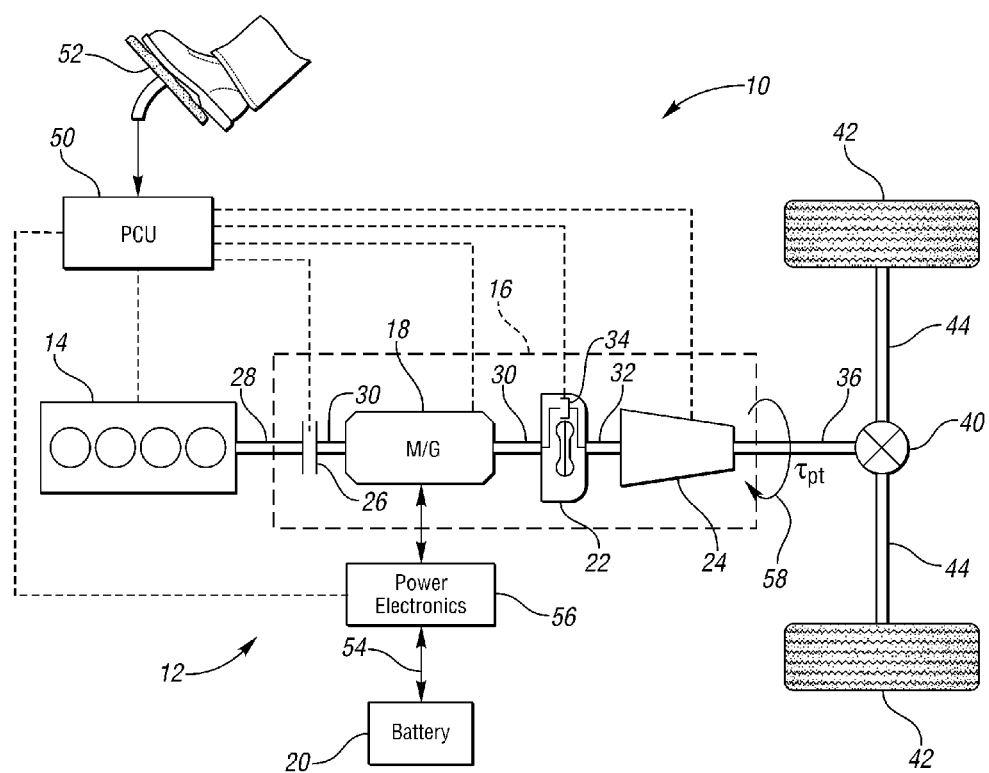
FIG. 1 is a schematic illustration of an exemplary powertrain of a hybrid electric vehicle.

Referring to FIG. 1, a schematic diagram of a hybrid electric vehicle 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18 coupled to an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 (sometimes referred to as a lock-up clutch) may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch (which may be a torque converter bypass clutch 34) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The engine 14 and the M/G 18 of the HEV 10 are both configured to generate a vehicle powertrain torque 58. The vehicle powertrain torque 58 may be generated by both the engine 14 and M/G 18 acting in unison, or by either the engine 14 or the M/G 18 acting alone.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
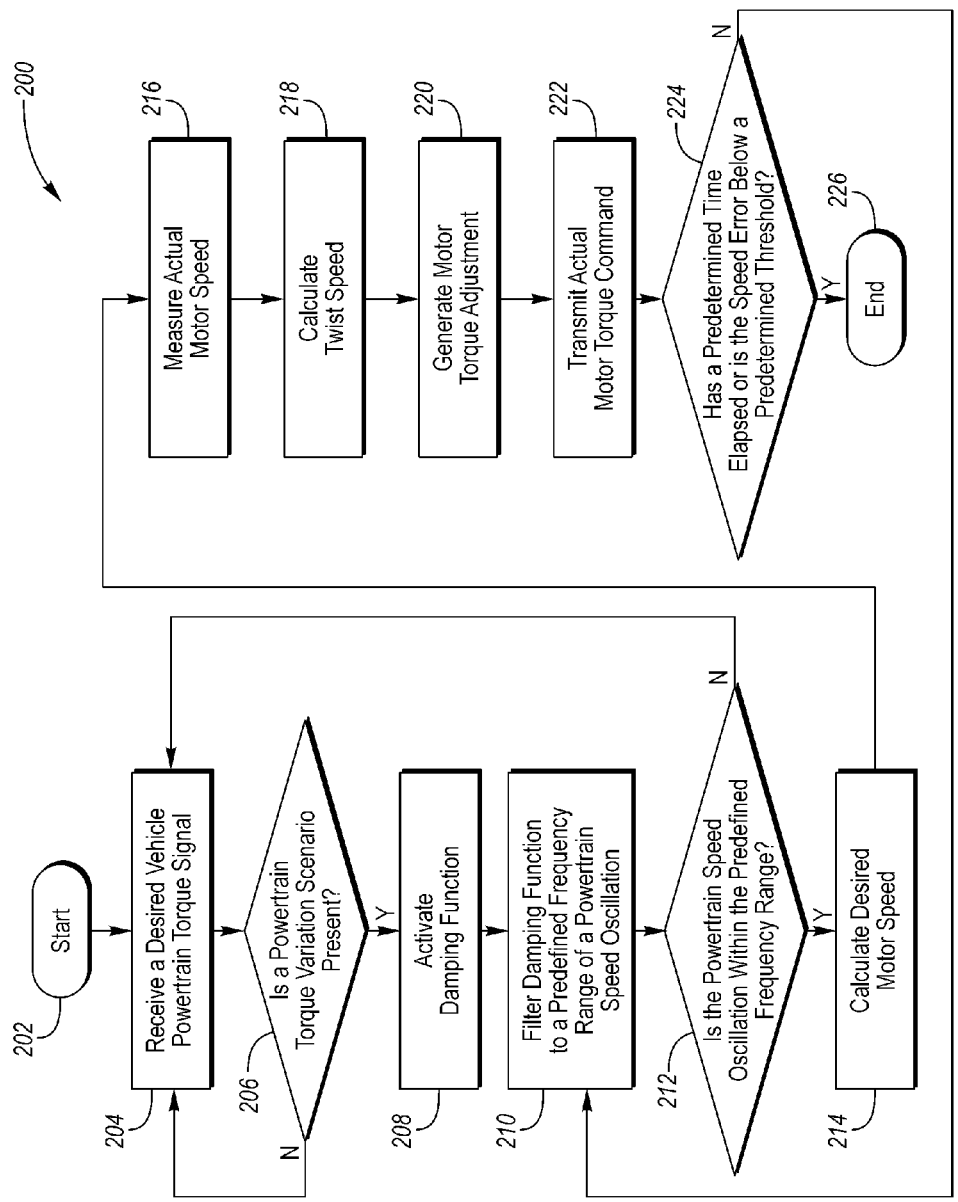
FIG. 2 is a flowchart illustrating an algorithm for controlling the motor torque in a hybrid electric vehicle according to one embodiment of the present disclosure.

FIG. 2 is a flowchart of an algorithm used in a method 200 for controlling the hybrid electric vehicle 10. The method 200 may be implemented using software code contained within the PCU 50. In other embodiments, the method may be implemented in other vehicle controllers, or distributed among multiple vehicle controllers. The embodiment described herein will assume the software code is contained within the PCU 50 for simplicity purposes.

At step 202 the HEV 10 is turned on and PCU 50 is powered up. After the vehicle has been turned on and the PCU 50 powered up, a desired vehicle powertrain torque signal is received at step 204 which is generated from the driver of the HEV 10 using the accelerator pedal 52. The desired vehicle powertrain torque signal is a representation the desired vehicle powertrain torque $\tau_{pt\_des}$, which is a summation of a desired engine torque $\tau_{e\_des}$ and a desired motor torque $\tau_{m\_des}$.

At step 206 it is determined whether a powertrain torque variation scenario is present. A powertrain torque variation scenario is a situation where there may be a powertrain speed oscillation. Oscillations in the speed of the powertrain typically result from resonance in the powertrain, which leads to unsmooth behavior that is felt by the driver. A powertrain torque variation scenario is a transient event in the powertrain torque which is a direct result of an instruction from the PCU 50, such as: an engine start, partially or a completely closing (also known as locking) of a launch clutch, a gear shift, a tip-in (increasing the power, torque, or drive command with the accelerator pedal 52), a tip-out (decreasing the power, torque, or drive command with the accelerator pedal 52), a large torque command (for example a torque that exceeds 50% of available torque), a partially or a completely closing (also known as locking) of a torque converter bypass clutch, etc. Torque variation scenarios however, may include additional situations which are not listed herein. If a torque variation scenario is present, a damping function is activated in step 208. If a torque variation scenario is not present, the method 200 returns to step 204 and is set to receive another vehicle powertrain torque signal.

Once the damping function is activated in step 208, the damping function in filtered in step 210 to operate within a predefined frequency range of the powertrain speed oscillation. At step 212, if the powertrain speed oscillation is not within the predefined frequency range, the method 200 returns to step 204 and is set to receive another vehicle powertrain torque signal. If the powertrain speed oscillation is within the predefined frequency range, then a desired motor speed is calculated at step 214, an actual motor speed is measured at step 216, and a twist speed is calculated at step 218, the twist speed being a difference between the measured motor speed and the desired motor speed.

At step 220 a motor torque adjustment is generated which is a function of the twist speed. The motor torque adjustment is then subtracted from the desired motor torque resulting in an actual motor torque command which is transmitted in step 222.

At step 224 the method 200 determines whether the damping function has been operating for a predetermined time or whether the speed error is below a predetermined threshold. The speed error being the difference between the measured motor speed and the desired motor speed divided by the desired motor speed. If the damping function has been operating for the predetermined time or speed error is below the predetermined threshold, the damping function comes to an end at step 226 and the method 200 returns to step 204 and is set to receive another vehicle powertrain torque signal. If the damping function has not been operating for the predetermined time and speed error is not below the predetermined threshold the damping function returns to the filtering step 210 and the process is repeated. The damping function will operate for a limited duration, which will last until the predetermined time has elapsed or the speed error has dropped below a predetermined threshold.

Although the various steps shown in the method 200 appear to occur in a chronological sequence, at least some of the steps may occur in a different order, and some steps may be performed concurrently or not at all.

Figure 3:
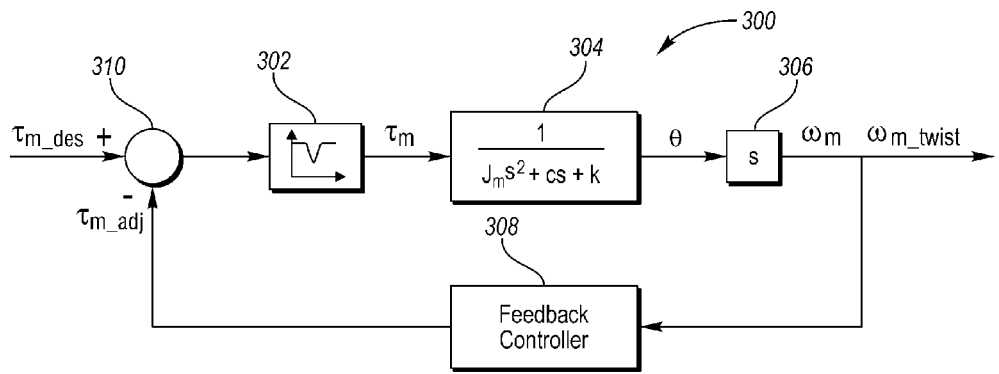
FIG. 3 illustrates a control for active motor damping of a vehicle powertrain torque according to one embodiment of the present disclosure.

Referring now to FIG. 3, a control system block diagram is shown illustrating one embodiment of the damping function utilized to adjust the motor torque in order to reduce a powertrain speed oscillation. The control 300 may include a filter 302 (shown here in a forward loop) that removes any desired frequency content and limits the damping function to within a predefined frequency range, the filter effectively functioning as a band pass filter. The predefined frequency range will likely include any powertrain torque variation scenario that has been identified to excite powertrain resonance resulting in unsmooth vehicle behavior. Furthermore, the filter may be a narrow band notch filter that limits the damping function to a narrow frequency range, such as 5 Hz to 7 Hz, for example. The narrow frequency ranges may vary however, and could range from anywhere between 1 Hz and 100 Hz.

In addition, the filter 302 may be dependent on a selected set of gears and gear ratio for the gearbox 24. Since the resonance that causes unsmooth behavior within the powertrain may occur at different frequencies of oscillations within the powertrain speed when different sets of gears and gear ratios have been selected, it may be an added advantage to modify or adjust filter 302 based on the frequency ranges that cause the unsmooth behavior for each set of gears and gear ratio that is utilized within the gearbox.

The mechanical system representing a simplified model of the M/G 18 is included within the control 300, and can be written as the following transfer function 304 that is shown in the forward loop:

$$P(s) = \frac{1}{J_m s^2 + cs + k}$$

where $J_m$ is the inertia of the M/G 18, c is a damping constant of the mechanical system, and k is a spring constant of the mechanical system. Transfer function 304 is used to determine an angular position θ of the M/G 18 corresponding to an input motor torque command $\tau_m$. The angular position θ of the M/G is input to a derivative block 306, the derivative having an output $\omega_m$, that represents the motor speed of the M/G 18 (the motor speed being an angular motor speed). Although the motor speed $\omega_m$ is shown as an output of the derivative 306, this is merely a representation of the mechanical system. The motor speed $\omega_m$ is typically a measured value of the rotation of the output shaft 30 of the M/G 18 and may also be referred to as the measured motor speed $\omega_m$. The motor speed may be measured using sensing technology such as a Hall Effect sensor that measures the rotations of the M/G shaft 30.

Figure 4:
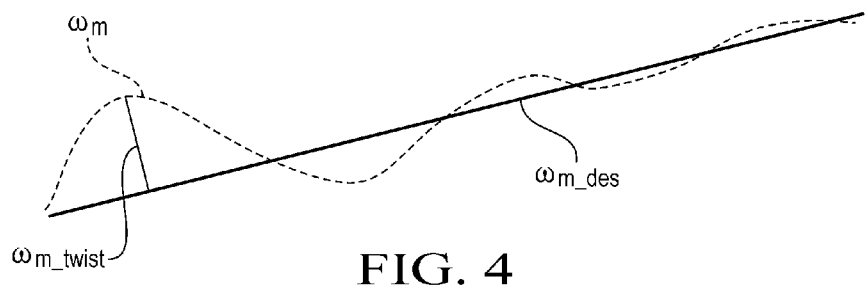
FIG. 4 illustrates a method for calculating the twist speed, which is the difference between the actual motor speed and the desired motor speed at any given instance.

Referring to FIG. 4, the measured motor speed $\omega_m$ is shown illustrating the oscillations that occur within the motor speed $\omega_m$ of the M/G 18. Also shown is a desired motor speed $\omega_{m\_des}$ which is calculated by generating a smooth line that approximates the measured motor speed $\omega_m$. The desired motor speed $\omega_{m\_des}$ may be constructed using numerical analysis curve fitting techniques such as interpolation or smoothing. Once the desired motor speed $\omega_{m\_des}$ is calculated, a twist speed $\omega_{m\_twist}$ is calculated, which is the difference between the measured motor speed $\omega_m$ and the desired motor speed $\omega_{m\_des}$.

Referring again to FIG. 3, once the twist speed $\omega_{m\_twist}$ has been calculated, it is used as an input in a feedback loop. The feedback loop may include a feedback controller 308 which may be a PD controller represented by the following transfer function:

$$H(s) = k_{md}\frac{s}{s+p} + k_{mp}$$

where $k_{md}$ is a derivative term relative to the twist speed $\omega_{m\_twist}$, $$\frac{s}{s+p}$$

is a lead filter, and $k_{mp}$ is a proportional term based on the twist speed $\omega_{m\_twist}$. The derivative term $k_{md}$ and the proportional term $k_{mp}$ may either be constant values or may be outputs from a tables stored in the PCU 50, where the input to the table(s) is the twist speed $\omega_{m\_twist}$. The output of the feedback controller 308 is a motor torque adjustment $\tau_{m\_adj}$. The motor torques adjustment $\tau_{m\_adj}$ is subtracted from the desired motor torque $\tau_{m\_des}$ at the summation node 310 resulting in a motor torque command $\tau_m$. The desired motor torque $\tau_{m\_des}$ will be the amount of torque provided by the M/G 18, when it is operating: as a generator, in hybrid mode, or in electric only mode. The motor torque command $\tau_m$ is once again used as an input to the transfer function 304 after passing through the filter 302.

In the alternative, $k_{md}$ may be a derivative term based on the motor speed $\omega_m$, $k_{mp}$ may be a proportional term based on the motor speed $\omega_m$, and the derivative term $k_{md}$ and the proportional term $k_{mp}$ may either be constant values or may be outputs from tables stored in the PCU 50, where the input to the table(s) is the motor speed $\omega_m$.

The feedback controller 308 should not be construed as limited to PD controllers only, but may include other types of controllers such as PI (proportional integral) controllers or PID (proportional integral derivative) controllers.

The control 300 will repeat the process until either a predetermined time has elapsed or the speed error reduces below a predetermined threshold. The speed error is the difference between the measured motor speed $\omega_m$ and the desired motor speed $\omega_{m\_des}$ (the twist speed $\omega_{m\_twist}$) and may be represented by the following equations:

$$e = \omega_m - \omega_{m\_des} \text{ or } e = \omega_{m\_twist}$$

Figure 5:
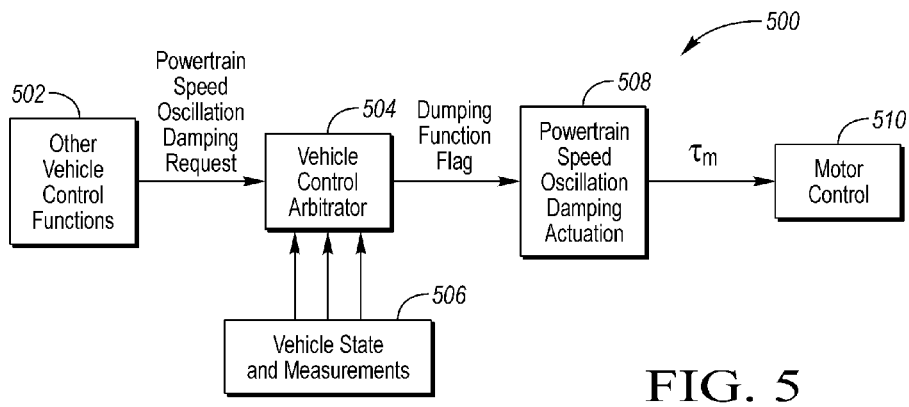
FIG. 5 is a flowchart illustrating the control architecture utilized to control the motor torque in a hybrid electric vehicle to counteract a powertrain speed oscillation.

Referring to FIG. 5, the control architecture 500 utilized to control the motor torque in a hybrid electric vehicle to counteract a powertrain speed oscillation illustrated. Other vehicle control functions 502 generate a powertrain speed oscillation damping request. These other vehicle control functions may include but are not limited to: engine controls; transmission controls; torque converter controls; torque converter bypass clutch controls; launch clutch controls; engine disconnect clutch controls; hybrid operation controls; brake system controls; motor/generator controls; torque, power, or drive command controls; etc. Once a powertrain speed oscillation damping request is generated, a vehicle control arbitrator 504 determines whether or not to turn on the damping function to adjust the motor torque in order to reduce a powertrain speed oscillation. The vehicle control arbitrator 504 determines whether or not to turn on the damping function based on the vehicle state and measurements 506. The vehicle state and measurements 506 inform the vehicle control arbitrator 504 whether or not a torque variation scenario is present where a powertrain speed oscillation damping is required. A powertrain torque variation scenario may include but is not limited to: an engine start, partially or a completely closing (also known as locking) of a launch clutch, a gear shift, a tip-in (increasing the power, torque, or drive command with the accelerator pedal 52), a tip-out (decreasing the power, torque, or drive command with the accelerator pedal 52), a large torque command (for example a torque that exceeds 50% of available torque), a partially or a completely closing (also known as locking) of a torque converter bypass clutch, etc.

Once it has been determined by the vehicle control arbitrator 504 that powertrain speed oscillation is present and damping is required, the vehicle control arbitrator 504 sends a damping function flag to the powertrain speed oscillation damping actuation step 508 where the motor torque command $\tau_m$ is calculated. The motor torque command $\tau_m$ is then sent to the motor control 510. The motor torque control 510 then sends the signals to the M/G 18 to adjust the motor torque in order to dampen powertrain speed oscillations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid electric vehicle comprising:
   an engine and an electric motor both configured to generate a vehicle powertrain torque; and
   a controller programmed to control the powertrain torque for a limited duration in response to a powertrain torque variation scenario using a damping function that adjusts the torque of the electric motor based on a difference between a measured motor speed, that is received by the controller via signals from a sensor measuring the speed of the electric motor, and a desired motor speed, that is estimated by the controller based on a curve-fitting interpolation of the measured motor speed, in order to counteract powertrain speed oscillations and to drive the measured motor speed towards the desired motor speed.

2. The hybrid electric vehicle of claim 1, wherein the powertrain torque variation scenario is at least one of: an engine start, a gear shift, a tip-in, a tip-out, or a large torque command.

3. The hybrid electric vehicle of claim 1, wherein the powertrain torque variation scenario is a partially or a completely closing of a launch clutch.

4. The hybrid electric vehicle of claim 1, wherein the powertrain torque variation scenario is a partially or a completely closing of a torque converter bypass clutch.

5. The hybrid electric vehicle of claim 1, wherein the damping function includes a notch filter in a forward loop to limit the damping function to within a predefined frequency range of the powertrain speed oscillations.

6. The hybrid electric vehicle of claim 1, wherein the damping function includes a feedback loop that generates a motor torque adjustment, which is subtracted from a desired motor torque resulting in an actual motor torque, the motor torque adjustment being based on a difference between a measured motor speed and a desired motor speed.

7. The hybrid electric vehicle of claim 6, wherein the feedback loop includes a derivative term which is proportional to a derivative of a difference between a measured motor speed and a desired motor speed and a proportional term which is proportional to the difference.

8. The hybrid electric vehicle of claim 1, wherein the limited duration is based upon either a predetermined elapsed time or when a speed error reduces below a predetermined threshold, the speed error being a difference between a measured motor speed and a desired motor speed.

9. A hybrid vehicle control method comprising:
   measuring an electric motor speed;
   interpolating a desired motor speed by applying a curve-fitting algorithm to the measured motor speed; and
   in response to a torque variation scenario, adjusting powertrain torque for a limited duration using the motor to counteract powertrain speed oscillations and drive measured motor speed towards desired motor speed using a damping function based on a difference between the measured and desired motor speeds.

10. The method of claim 9, wherein the powertrain torque variation scenario is at least one of: an engine start, a gear shift, a tip-in, a tip-out, or a large torque command.

11. The method of claim 9, wherein the powertrain torque variation scenario is a partially or a completely closing of a launch clutch.

12. The method of claim 9, wherein the powertrain torque variation scenario is a partially or a completely closing of a torque converter bypass clutch.

13. The method of claim 9, wherein the damping function includes a notch filter in a forward loop to limit the damping function to within a predefined frequency range of the powertrain speed oscillations.

14. The method of claim 9, wherein the damping function includes a feedback loop that generates a motor torque adjustment, which is subtracted from a desired motor torque resulting in an actual motor torque, the motor torque adjustment being based on a difference between a measured motor speed and a desired motor speed.

15. The method of claim 14, wherein the feedback loop includes a derivative term which is proportional to a derivative of a difference between a measured motor speed and a desired motor speed and a proportional term which is proportional to the difference.

16. The method of claim 9, wherein the limited duration is based upon either a predetermined elapsed time or when a speed error reduces below a predetermined threshold, the speed error being a difference between a measured motor speed and a desired motor speed.

17. A method for controlling a hybrid electric vehicle comprising:

controlling motor torque for a limited duration in anticipation of a powertrain torque variation scenario based on a damping function, the damping function comprising:
  a notch filter in a forward loop to limit the damping function to within a predefined frequency range of powertrain speed oscillations;
  a feedback loop that generates a motor torque adjustment, which is subtracted from a desired motor torque resulting in an actual motor torque, the motor torque adjustment being based on an adjustment algorithm that is based on a difference between a measured motor speed and a desired motor speed, wherein the measured motor speed is received from a sensor and the desired motors speed is interpolated by applying a curve-fitting algorithm to the measured motor speed; and
adjusting a vehicle powertrain torque with the damping function using an electric motor to counteract powertrain speed oscillations and to drive the measured motor speed towards the desired motor speed.

18. The method for controlling a hybrid electric vehicle of claim 17, wherein the powertrain torque variation scenario is at least one of: an engine start, a partially or a completely closing of a launch clutch, a gear shift, a tip-in, a tip-out, a large torque command, or a partially or a completely closing of a torque converter bypass clutch.

19. The method for controlling a hybrid electric vehicle of claim 17, wherein the feedback loop includes a derivative term which is proportional to a derivative of a difference between a measured motor speed and a desired motor speed and a proportional term which is proportional to the difference.

20. The method for controlling a hybrid electric vehicle of claim 17, wherein the limited duration is based upon either a predetermined elapsed time or a speed error becoming less than a corresponding threshold, the speed error being a difference between a measured motor speed and a desired motor speed.

* * * * *